(12) United States Patent
Suga et al.

(10) Patent No.: US 8,696,454 B2
(45) Date of Patent: Apr. 15, 2014

(54) SERVER DEVICE, AND NON-TRANSITORY COMPUTER-READABLE STORAGE MEDIUM STORING GAME PROGRAM

(71) Applicant: DeNA Co., Ltd., Tokyo (JP)

(72) Inventors: Akihiro Suga, Tokyo (JP); Sadaaki Satsuma, Tokyo (JP); Shota Tanaka, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/944,791

(22) Filed: Jul. 17, 2013

(65) Prior Publication Data

US 2014/0080595 A1 Mar. 20, 2014

(30) Foreign Application Priority Data

Sep. 14, 2012 (JP) .................................. 2012-202806

(51) Int. Cl.
*A63F 13/00* (2006.01)

(52) U.S. Cl.
USPC ................... 463/31; 463/16; 463/17; 463/19; 463/20; 463/33; 463/39; 463/40; 463/42; 463/43

(58) Field of Classification Search
USPC .......... 463/1, 9.16–20, 29, 30–34, 36, 39–43, 463/9
See application file for complete search history.

(56) References Cited

U.S. PATENT DOCUMENTS

| | | | |
|---|---|---|---|
| 7,402,105 B1 * | 7/2008 | Hutter et al. | 463/42 |
| 2007/0123335 A1 * | 5/2007 | Okada | 463/16 |
| 2009/0221344 A1 * | 9/2009 | Fong et al. | 463/20 |
| 2010/0146409 A1 * | 6/2010 | Yoshida et al. | 715/757 |

FOREIGN PATENT DOCUMENTS

| | | |
|---|---|---|
| JP | 2008-093165 | 4/2008 |
| JP | 2008-253521 | 10/2008 |

OTHER PUBLICATIONS

Japanese Patent Application No. 2012-202806 of Office Action mailed on Dec. 11, 2012.
Grand Collection Prompt Report Gear Second, "Naraku no soko made mellorine love (madly love into a bottomless pit), ~get on with Sanji's swimming wear paradise~", livedoor Blog, Jul. 21, 2012, <URL:http://onepiecemobile.doorblog.jp/archives/12152757.html>.
Banana King Slot, Apr. 26, 2011, http://www.youtube.com/watch?feature=player_detailpage&v=Wh4TNTnvsl8#t=48.

* cited by examiner

*Primary Examiner* — Sunit Pandya
(74) *Attorney, Agent, or Firm* — Procopio, Cory, Hargreaves & Savitch LLP

(57) ABSTRACT

A server device is connected with a player terminal that displays a game screen including a game content arrangement area in a manner capable of communicating information. The server device includes: a storage unit configured to store a plurality of pieces of game content including special game content; an arrangement unit configured to arrange game content in the game content arrangement area; a determination unit configured to determine whether the special game content is included in a plurality of pieces of game content; and a grant unit configured to grant a part of game content selected from the plurality of pieces of game content, or all of game content to a player when the special game content is not included, and to grant only a part of game content selected from the plurality of pieces of game content to the player when the special game content is included.

10 Claims, 14 Drawing Sheets

FIG. 4

| CARD ID | CHARACTER NAME | CHARACTER IMAGE | RARITY | INITIAL ATTACK POWER | INITIAL DEFENSE POWER | INITIAL PHYSICAL POWER |
|---|---|---|---|---|---|---|
| 0001 | CHARACTER A | | COMMON | 15 | 8 | 10 |
| 0002 | CHARACTER B | | UNCOMMON | 30 | 20 | 15 |
| 0003 | CHARACTER C | | RARE | 45 | 30 | 25 |
| 0004 | CHARACTER D | | SUPER RARE | 60 | 55 | 60 |
| ... | ... | ... | ... | ... | ... | ... |

FIG. 5

| PLAYER ID | FRIEND PLAYER ID | THE NUMBER OF POSSESSED BALLS | POSSESSED CARD INFORMATION |
|---|---|---|---|
| 1 | 5, 8 | 20 | POSSESSED CARD INFORMATION (1) |
| 2 | NONE | 3 | POSSESSED CARD INFORMATION (2) |
| 3 | 4, 6 | 8 | POSSESSED CARD INFORMATION (3) |
| 4 | 3, 6 | 50 | POSSESSED CARD INFORMATION (4) |
| 5 | 1, 6 | 9 | POSSESSED CARD INFORMATION (5) |
| 6 | 3, 4, 5 | 1 | POSSESSED CARD INFORMATION (6) |
| . | . | . | . |
| . | . | . | . |
| . | . | . | . |

FIG. 6

POSSESSED CARD INFORMATION (3)
POSSESSED CARD INFORMATION (2)
POSSESSED CARD INFORMATION (1)

| POSSESSED CARD ID | LEVEL | ATTACK POWER | DEFENSE POWER | PHYSICAL POWER | ... |
|---|---|---|---|---|---|
| 0011 | Lv.3 | 25 | 100 | 60 | |
| 0211 | Lv.4 | 70 | 70 | 80 | |
| 0133 | Lv.7 | 60 | 300 | 100 | |
| ... | | ... | ... | ... | |

FIG. 7

| FIRST CARD BOX (1) | | |
|---|---|---|
| NUMBER | RARITY | CARD ID |
| 1 | COMMON | 2011 |
| ⋮ | ⋮ | ⋮ |
| 100 | RARE | 1003 |
| ⋮ | ⋮ | ⋮ |
| 200 | RARE | 0823 |
| ⋮ | ⋮ | ⋮ |
| 300 | RARE | 0013 |
| ⋮ | ⋮ | ⋮ |
| 1200 | SUPER RARE | 0104 |

FIG. 8

| SECOND CARD BOX (1) | | |
|---|---|---|
| NUMBER | RARITY | CARD ID |
| 1 | COMMON | 1231 |
| ⋮ | ⋮ | ⋮ |
| 10 | RARE | 2103 |
| ⋮ | ⋮ | ⋮ |
| 20 | RARE | 0513 |
| ⋮ | ⋮ | ⋮ |
| 30 | RARE | 0743 |
| ⋮ | ⋮ | ⋮ |
| 300 | SUPER RARE | 1054 |

(SECOND CARD BOX (2), SECOND CARD BOX (3), ...)

FIG. 9

| CARD ARRANGEMENT ||
|---|---|
| AREA ID | CARD ID |
| 1 | 0051 |
| 2 | 1240 |
| 3 | 0756 |
| 4 | 1089 |
| 5 | 0133 |
| 6 | 0007 |
| 7 | 0936 |
| 8 | 0211 |
| 9 | 0011 |

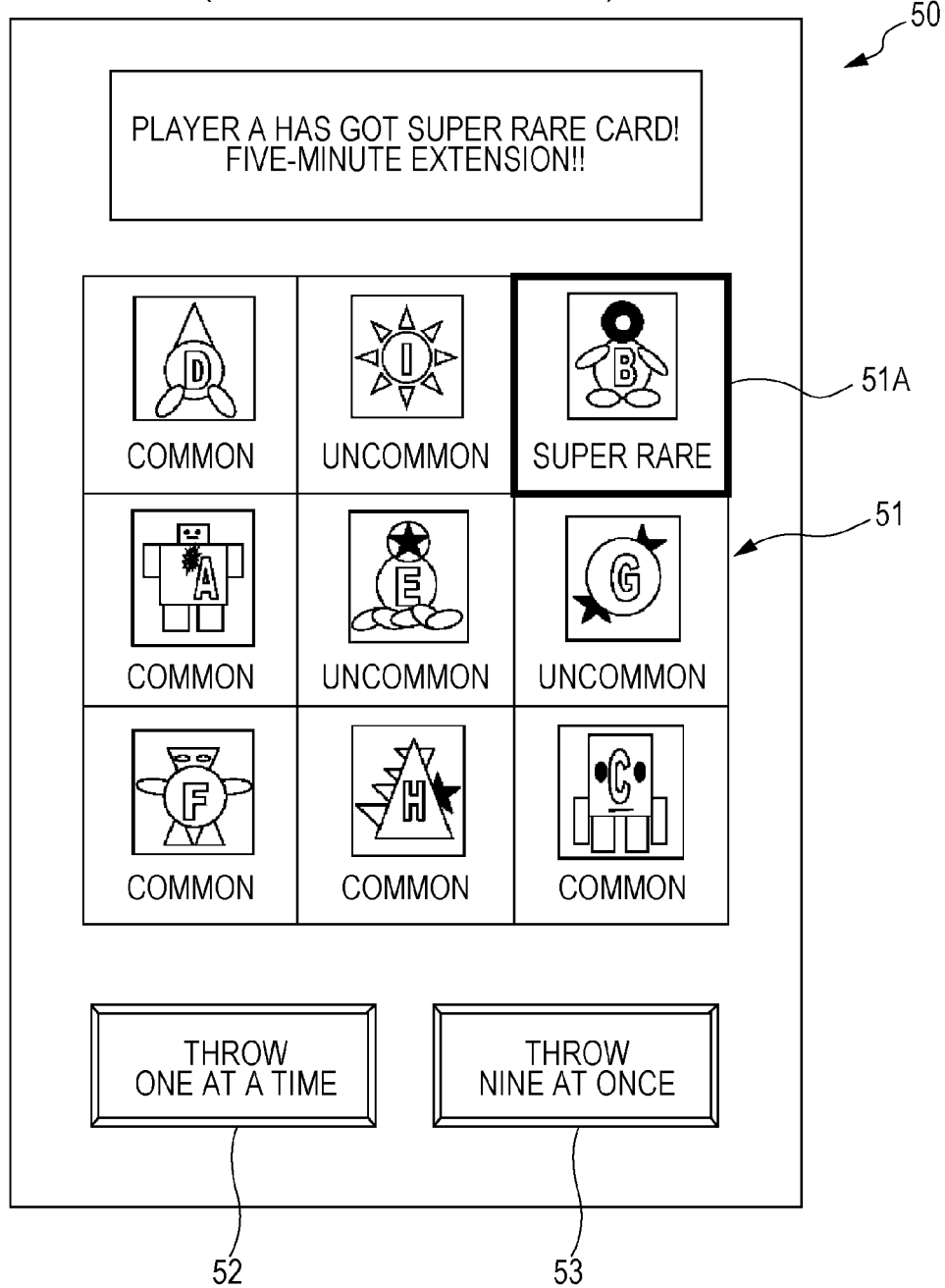

SERVER DEVICE, AND NON-TRANSITORY COMPUTER-READABLE STORAGE MEDIUM STORING GAME PROGRAM

CROSS-REFERENCE TO RELATED APPLICATION(S)

This application claims the benefit of Japanese Patent Application No. 2012-202806, filed Sep. 14, 2012, the disclosure of which is hereby incorporated by reference in its entirety.

BACKGROUND OF THE INVENTION

1. Field of the Invention

The present invention relates to a server device and a non-transitory computer-readable storage medium storing game program.

2. Description of the Related Art

A game system provided with a server device connected with a plurality of player terminals in a manner capable of communicating information has been known (for example, Japanese Patent Application Laid-Open No. 2008-253521).

SUMMARY OF THE INVENTION

In such a game system, game content selected from a plurality of pieces of game content is granted to a player upon execution of a lottery game. Here, it is assumed that a plurality of pieces of game content including special game content is presented in advance before granting game content, and all of the plurality of pieces of game content can be granted to the player at once. In this case, the player can easily obtain the special game content presented in advance. Therefore, an incentive of the player for the lottery game is decreased.

The present invention has been made in view of the foregoing, and an objective of the present invention is to enhance the incentive of the player for a game.

A principle embodiment of the present invention to solve the above-described problem is a server device connected with a player terminal that displays a game screen including a game content arrangement area in a manner capable of communicating information, the server device including:

a storage unit configured to store a plurality of pieces of game content including special game content;

an arrangement unit configured to arrange game content selected from the plurality of pieces of game content in the game content arrangement area;

a determination unit configured to determine, upon request from the player terminal, whether the special game content is included in a plurality of pieces of game content arranged in the game content arrangement area; and a grant unit configured to grant a part of game content selected from the plurality of pieces of game content arranged in the game content arrangement area, or all of game content arranged in the game content arrangement area to a player when the special game content is not included, and to grant only a part of game content selected from the plurality of pieces of game content arranged in the game content arrangement area to the player when the special game content is included.

Other features of the present invention will become apparent from the description of the present specification and the appended drawings.

According to an embodiment of the present invention, an incentive of a player for a game can be enhanced.

BRIEF DESCRIPTION OF THE DRAWINGS

FIG. 4 is a table illustrating an exemplary data structure of card information;

FIG. 5 is a table illustrating an exemplary data structure of player information;

FIG. 6 is a diagram illustrating an exemplary data structure of possessed card information;

FIG. 7 is a diagram illustrating an exemplary data structure of card box information;

FIG. 8 is a diagram illustrating an exemplary data structure of card box information;

FIG. 9 is a diagram illustrating an exemplary data structure of card arrangement information;

FIGS. 13A and 13B are diagrams for describing another modification.

DETAILED DESCRIPTION OF THE INVENTION

Figure 1:
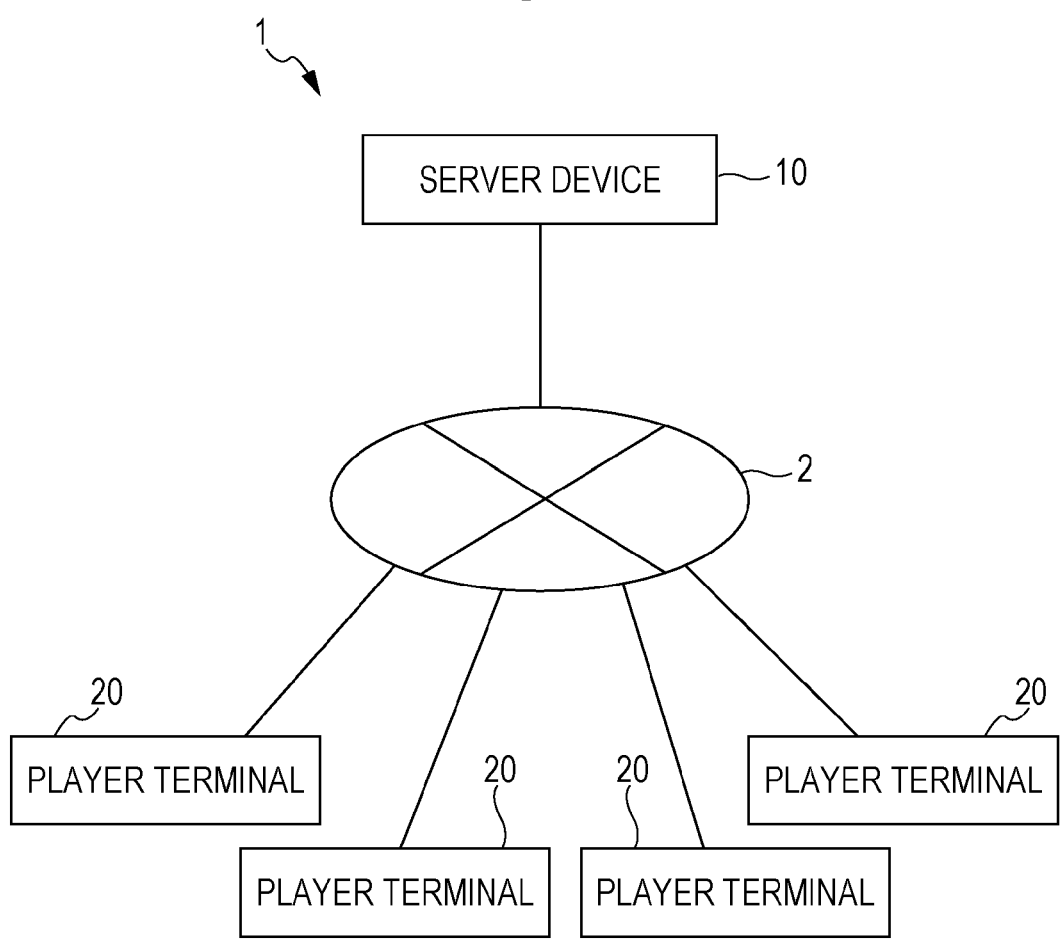
FIG. 1 is a diagram illustrating an exemplary overall configuration of a game system.

At least the following matters will become apparent according to the description of the present specification and the appended drawings.

That is, a server device connected with a player terminal that displays a game screen including a game content arrangement area in a manner capable of communicating information includes:

a storage unit configured to store a plurality of pieces of game content including special game content;

an arrangement unit configured to arrange game content selected from the plurality of pieces of game content in the game content arrangement area;

a determination unit configured to determine, upon request from the player terminal, whether the special game content is included in a plurality of pieces of game content arranged in the game content arrangement area; and a grant unit configured to grant a part of game content selected from the plurality of pieces of game content arranged in the game content arrangement area, or all of game content arranged in the game content arrangement area to a player when the special game content is not included, and to grant only a part of game content selected from the plurality of pieces of game content arranged in the game content arrangement area to the player when the special game content is included.

According to such a server device, the player can enhance the incentive for a game for obtaining special game content.

Further, in the server device, the game content arrangement area may include a plurality of unit areas, the arrangement unit may arrange the game content in each of the plurality of unit areas, and upon request from the player terminal, the grant unit may grant at least one or more pieces of game content selected from the game content arranged in the plurality of unit areas to the player when the special game content is not included in the game content arrangement area, and may grant game content less than the total number of the unit areas to the player when the special game content is included in the game content arrangement area.

According to such a server device, by configuring the game content arrangement area from a plurality of unit areas, the arrangement of the special game content can be made clear, and an incentive of the player for a game can be enhanced.

Further, in the server device, when one piece of game content is granted to the player by the grant unit, the arrangement unit may set a unit area, in which the granted game content has been arranged, to be in a vacant state in which game content is not arranged, when a plurality of pieces of game content is given to the player at once by the grant unit, the arrangement unit may set each of a plurality of unit areas, in which the plurality of pieces of granted game content is arranged, to be in the vacant state in which game content is not arranged, and when new game content is arranged in the unit area set in the vacant state, the arrangement unit may set the probability of the special game content being arranged as the new game content to be higher in the case where the plurality of pieces of game content is granted to the player at once than in the case where the one piece of game content is granted to the player.

According to such a server device, when a plurality of unit areas is set in a vacant state, the probability of the special game content being arranged in the unit area in the vacant state becomes higher. Therefore, the incentive of the player for the game can be further enhanced.

Further, in the server device, the storage unit may store at least one or more pieces of game content possessed by the player and another player, respectively, and the arrangement unit may select game content possessed by the another player by referring to the storage unit, and arrange the selected game content in the unit area in the vacant state.

According to such a server device, the game content possessed by another player can be arranged in the unit area in the vacant state. Therefore, communication with other players becomes possible.

Further, in the server device, the arrangement unit may control the special game content to be arranged for a predetermined time when the special game content is included in the plurality of pieces of game content arranged in the game content arrangement area.

According to such a server device, by providing limitation to arrangement time of the special game content, the incentive of the player for the game can be further enhanced.

Further, a non-transitory computer-readable storage medium storing a game program causes a computer, which serves as a server device connected with a player terminal that displays a game screen including a game content arrangement area in a manner capable of communicating information, to realize:

storing a plurality of pieces of game content including special game content in a storage unit;

arranging game content selected from the plurality of pieces of game content in the game content arrangement area;

determining, upon request from the player terminal, whether the special game content is included in a plurality of pieces of game content arranged in the game content arrangement area; and granting a part of game content selected from the plurality of pieces of game content arranged in the game content arrangement area, or all of game content arranged in the game content arrangement area to a player when the special game content is not included, and granting only a part of game content selected from the plurality of pieces of game content arranged in the game content arrangement area to the player when the special game content is included.

According to such a game program, the incentive of the player for a game can enhanced.

Embodiments

Configuration of Game System 1

FIG. 1 is a diagram illustrating an exemplary overall configuration of a game system 1 according to the present embodiment. The game system 1 provides a player with various services related to games through a network 2 (for example, the Internet), and includes a server device 10 and a plurality of player terminals 20.

<Configuration of Server Device 10>

Figure 2:
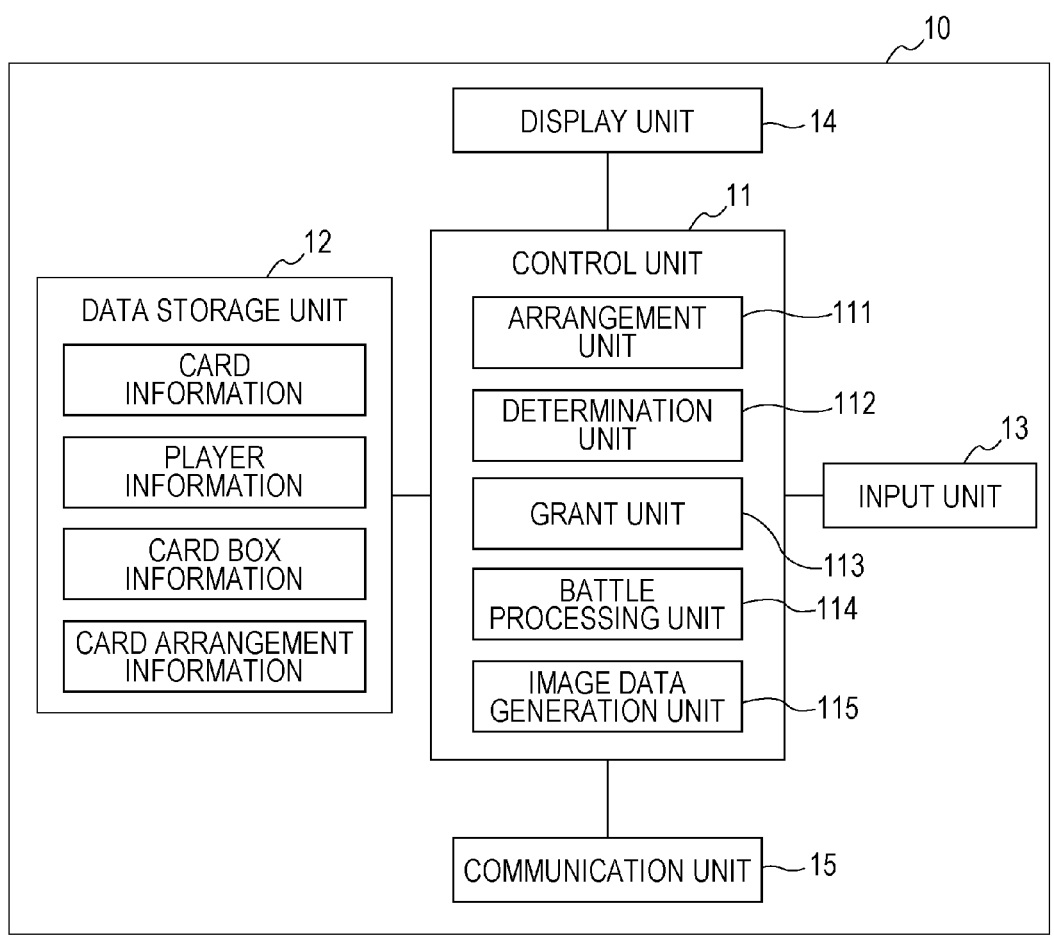
FIG. 2 is a block diagram illustrating a functional configuration of a server device.

FIG. 2 is a block diagram illustrating a functional configuration of the server device 10 according to the present embodiment.

The server device 10 is an information processing apparatus (for example, a workstation or a personal computer) used when a system administrator and the like manage the game service. Upon receiving various commands (requests) from the player terminal 20, the server device 10 can distribute a game program operable on the player terminal 20, and a web page and the like made in a markup language (HTML and the like) according to a specification of the player terminal 20. The server device 10 includes a control unit 11, a data storage unit 12, an input unit 13, a display unit 14, and a communication unit 15.

The control unit 11 performs data passing among units as well as controlling the entire server device 10, and is realized by a central processing unit (CPU) executing a program stored in a predetermined memory. The control unit 11 of the present embodiment includes an arrangement unit 111, a determination unit 112, a grant unit 113, a battle processing unit 114, and an image data generation unit 115.

The arrangement unit 111 has a function to execute processing of arranging a plurality of pieces of game content in a game content arrangement area including a plurality of unit areas. The game content refers to, for example, a game card and a figure associated with a character and the like, and items such as a tool and an ability that can be used in a game. The determination unit 112 has a function to determine whether particular game content (hereinafter, also referred to as special game content) is included in the plurality of pieces of game content arranged in the game content arrangement area. The grant unit 113 has a function to execute processing of granting, to the player, game content to be used in a game. The battle processing unit 114 has a function to execute various types of processing related to a battle, such as processing of determining an outcome of the battle between a player character and an enemy character. The image data generation unit 115 has a function to execute processing of generating image data for displaying, on the player terminal 20, a game screen and an operation screen to be played by the player.

The data storage unit 12 includes a read only memory (ROM) that is a read-only storage area in which a system program is stored, and a random access memory (RAM) that is a rewritable storage area used as a work area for arithmetic processing by the control unit 11. The data storage unit 12 is realized by, for example, a non-volatile storage device, such as a flash memory and a hard disk. The data storage unit 12 of the present embodiment stores card information, player information, card box information, and card arrangement information. The card information relates to game cards used in a game. The player information relates to a player. The card box information relates to a virtual card box in which a plurality of game cards to be arranged in the card arrangement area is housed. The card arrangement information relates to the card arrangement area. Note that each of the information will be described below in detail.

The input unit 13 is used for inputting various data (for example, the card information) by the system administrator and the like, and is realized by, for example, a keyboard and a mouse.

The display unit 14 is used for displaying an operation screen for the system administrator based on a command from the control unit 11, and is realized by, for example, a liquid crystal display (LCD).

The communication unit 15 is used for performing communication with the player terminal 20. The communication unit 15 has a function as a reception unit that receives various data and signals transmitted from the player terminal 20, and a function as a transmission unit that transmits various data and signals to the player terminal 20 according to a command of the control unit 11. The communication unit 15 is realized by, for example, a network interface card (NIC).

<Configuration of Player Terminal 20>

Figure 3:
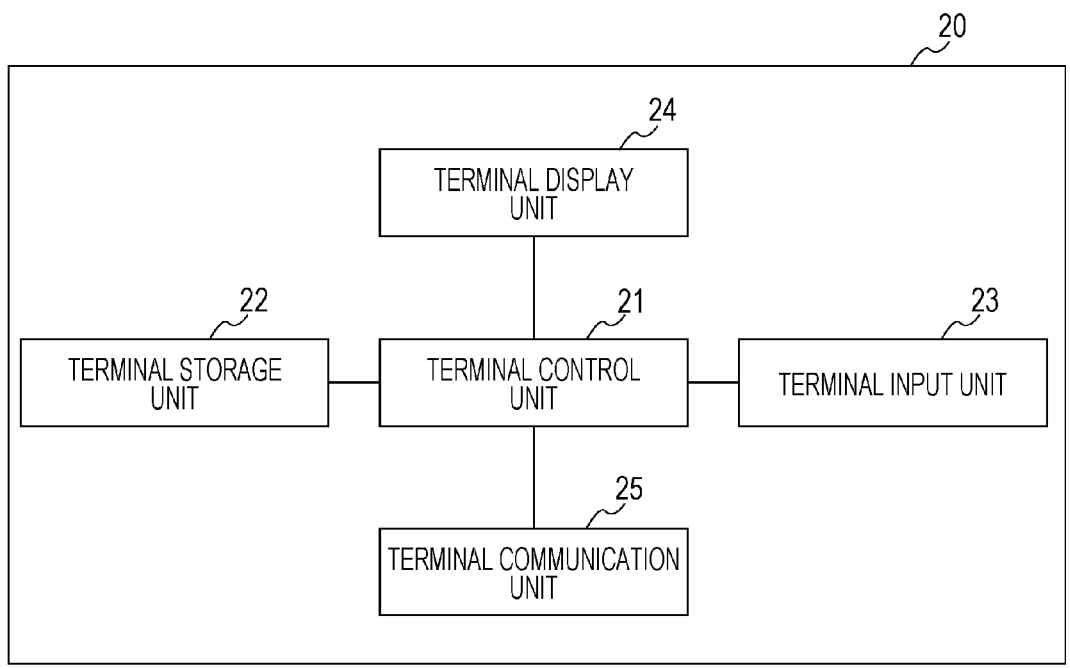
FIG. 3 is a block diagram illustrating a functional configuration of a player terminal.

FIG. 3 is a block diagram illustrating a functional configuration of the player terminal 20. The player terminal 20 of the present embodiment is an information processing apparatus (for example, a mobile phone terminal or a smartphone) used by the player when a game is played. The player terminal 20 can request the server device 10 to distribute various types of information (a game program, a web page, and the like) related to the game. Since the player terminal 20 has a web browser function for allowing the player to browse a web page, the web page (a game play image, and the like) distributed from the server device 10 can be displayed on a screen. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) executing a program stored in a predetermined memory. Note that the terminal control unit 21 of the present embodiment also functions as a screen display control unit that controls the display state of the game screen displayed on the terminal display unit 24.

The terminal storage unit 22 is connected to the terminal control unit 21 through a bus, and performs processing of referring to, reading, and rewriting stored data according to a command from the terminal control unit 21. The terminal storage unit 22 is realized by, for example, a flash memory and a hard disk.

The terminal input unit 23 is used by the player for performing various operations (a game operation, and the like), and is realized by, for example, an operation button and a touch panel.

The terminal display unit 24 is used for displaying a game screen (a game image, an operation image, and the like) according to a command from the terminal control unit 21, and is realized by, for example, a liquid crystal display (LCD).

The terminal communication unit 25 functions as a transmission/reception unit for transmitting/receiving various types of information to/from the server device 10 through the network 2, and is realized by, for example, a network interface card (NIC).

<Data Structure>

FIG. 4 is a diagram illustrating an exemplary data structure of the card information stored in the data storage unit 12 of the server device 10. The card information includes items (fields), such as a card ID, a character name, a character image, rarity, initial attack power, initial defense power, and initial physical power. The card ID is identification information for identifying a game card as an example of the game content. The determination unit 112 can determine the rarity of a game card with the last one digit of the card ID, for example. The character name is information indicating a display name of a character associated with a game card. The character image is image data of a character. The rarity is a parameter indicating the degree of rarity of a game card. In the present embodiment, four levels of rarity ("common"→"uncommon"→"rare"→"super rare") are set to a game card (character). The initial attack power, initial defense power, initial physical power, and the like of a character are parameters indicating ability values initially set to the character.

FIG. 5 is a table illustrating an exemplary data structure of the player information stored in the data storage unit 12 of the server device 10. The player information includes items, such as a player ID, a friend player ID, a coin, the number of possessed balls, and possessed card information. The player ID is identification information for identifying the player. The friend player ID is information indicating other players registered in a friend list of the player. The number of possessed balls is information indicating the number of balls possessed by the player, and is updated when the player obtains or consumes a ball, for example. The ball is an example of a virtual lottery token used in a lottery game described below, and is granted according to consumption of a game point stored in association with the player, or according to game progress. The possessed card information is information indicating a game card possessed by the player (hereinafter, also referred to as a possessed card).

FIG. 6 is a table illustrating an exemplary data structure of the possessed card information. The possessed card information includes items, such as a possessed card ID, a level of the possessed card, attack power, defense power, and physical power. The possessed card ID is identification information for identifying a possessed card. The level of the possessed card, the attack power, the defense power, the physical power, and the like are parameters indicating ability values set to a character corresponding to a possessed card. These various parameters are updated according to a result of a battle game, and the like.

FIGS. 7 and 8 are diagrams each illustrating an exemplary data structure of the card box information stored in the data storage unit 12 of the server device 10. The card box information is an example of game content information, and defines a virtual card box in which a predetermined number of game cards arranged in the card arrangement area, as an example of the game content arrangement area, are put together to make one set. The rarity is set in the card box information, the rarity indicating the degree of rarity corresponding to each of the plurality of game cards (card IDs) to which serial numbers are given. In the present embodiment, two types of card boxes: a first card box and a second card box are prepared. The second card box is configured such that the probability of a super rare card as an example of the special card being arranged in the card arrangement area is higher than that of the first card box.

The first card box configures the card box information in which, as illustrated in FIG. 7, 1200 game cards to which serial numbers 1 to 1200 are given are put in numerical order, and a game card selected from the card box information according to numerical order is arranged in the card arrangement area. Rare cards are set at predetermined intervals, such as at the 100th, 200th, 300th . . . positions, and a super rare card is set at the 1200th position. Common cards and uncommon cards are set to other numbers. A plurality of first card boxes is prepared, and a card box having 1200 cards in one set is exchanged one after another. Therefore, the first card box is equivalent to a card box in which a super rare card is set in every 1200 cards. Note that the numerical order of each game card in the card box may be randomly set.

The second card box configures card box information in which, as illustrated in FIG. 8, 300 game cards to which serial numbers 1 to 300 are given are put in numerical order, and a game card selected from the card box information according to numerical order is arranged in the card arrangement area. Rare cards are set at predetermined intervals, such as at the 10th, 20th, 30th . . . positions, and a super rare card is set at the 300th position. Common cards and uncommon cards are set to other numbers. A plurality of second card boxes is prepared, and a card box having 300 game cards in one set is exchanged one after another. Therefore, the second card box is equivalent to a card box in which a super rare card is set in every 300 game cards.

In this manner, the probability of a super rare card being arranged in the card arrangement area of the second card box is set higher than that of the first cad box by taking the appearance interval of a super rare card in the second card box smaller than in the first card box.

FIG. 9 is a diagram illustrating an exemplary data structure of the card arrangement information stored in the data storage unit 12 of the server device 10. The card arrangement information includes items of an area ID and a card ID. The area ID is identification information for identifying a unit area that configures the card arrangement area. The card arrangement area of the present embodiment is divided into nine unit areas, and thus, nine area IDs are set. The card ID is identification information for identifying a game card (character) arranged in a unit area of a corresponding area ID. The card arrangement information is updated every time a game card arranged in each unit area is changed.

<Outline of Game>

Here, an outline of a game provided by the game system 1 of the present embodiment will be described. In the game system 1, a battle game is provided, which is performed using a game card (a virtual card used in a virtual space on the game) as an example of the game content.

(Battle Game)

In the game system 1 of the present embodiment, the player can possess a plurality of game cards associated with game characters. The player can perform a battle game using a game card (character) selected from the plurality of possessed game cards. The battle processing unit 114 determines an enemy character that battles against the character selected by the player, and determines an outcome of the battle game between the characters based on the various parameters set to the characters (the attack power, defense power, physical power, vital power, and the like).

(Grant of Game Card)

In the game system 1 of the present embodiment, a game card is granted to the player when the player has won the battle against the enemy character or when a lottery game is performed. The player can possess the granted game card, and can perform the above-described battle game using that game card.

In the present embodiment, as an example of the lottery game through which a game card is granted, a target hitting game is performed. In the target hitting game, a lottery is performed in such a manner that the player throws a ball toward any of the game cards arranged in the card arrangement area divided into a total of nine (3×3) squares (unit areas), and one of the game cards arranged in any of the nine squares is granted to the player.

The player can perform the target hitting game by consuming one ball (by throwing one ball) or by consuming nine balls to hit all of the nine squares (by throwing nine balls). In the former case, one lottery is performed by consuming one ball, and one game card selected from the card arrangement area is granted to the player. In the latter case, by consuming nine balls, all of the nine game cards in the card arrangement area are granted at once.

The card arrangement area may be individually allocated to each player, or may be shared by a plurality of players. Further, a plurality of card arrangement areas may be allocated to the player. Here, in the case where the card arrangement area is individually allocated to each player, the player can aim at obtaining a special card (super rare card) without caring about the lotteries of other players. In the case where the plurality of players shares the card arrangement area, on the other hand, the players mutually use tactics for aiming at obtaining the special card (super rare card) while checking the nine game cards arranged in the card arrangement area.

In the target hitting game of the present embodiment, a plurality of first card boxes each including 1200 game cards as one set, and a plurality of second card boxes each including 300 game cards as one set are prepared. When a game card is granted to the player as a result of the target hitting game, the number of game cards in the card arrangement area becomes insufficient. When the game cards in the card arrangement area become insufficient, the card arrangement area is replenished with a game card selected from any of the card boxes in numerical order. The game cards in the card box are gradually decreased, and become insufficient as a result of the card arrangement area being replenished with the game cards. In this case, the card box is replaced with a next card box. Therefore, the game cards can be granted to the player on a constant basis.

Hereinafter, an exemplary operation performed by the game system 1 according to the present embodiment to grant a game card to the player in such a target hitting game will be specifically described.

<Exemplary Operation of Game System 1>

Figure 10:
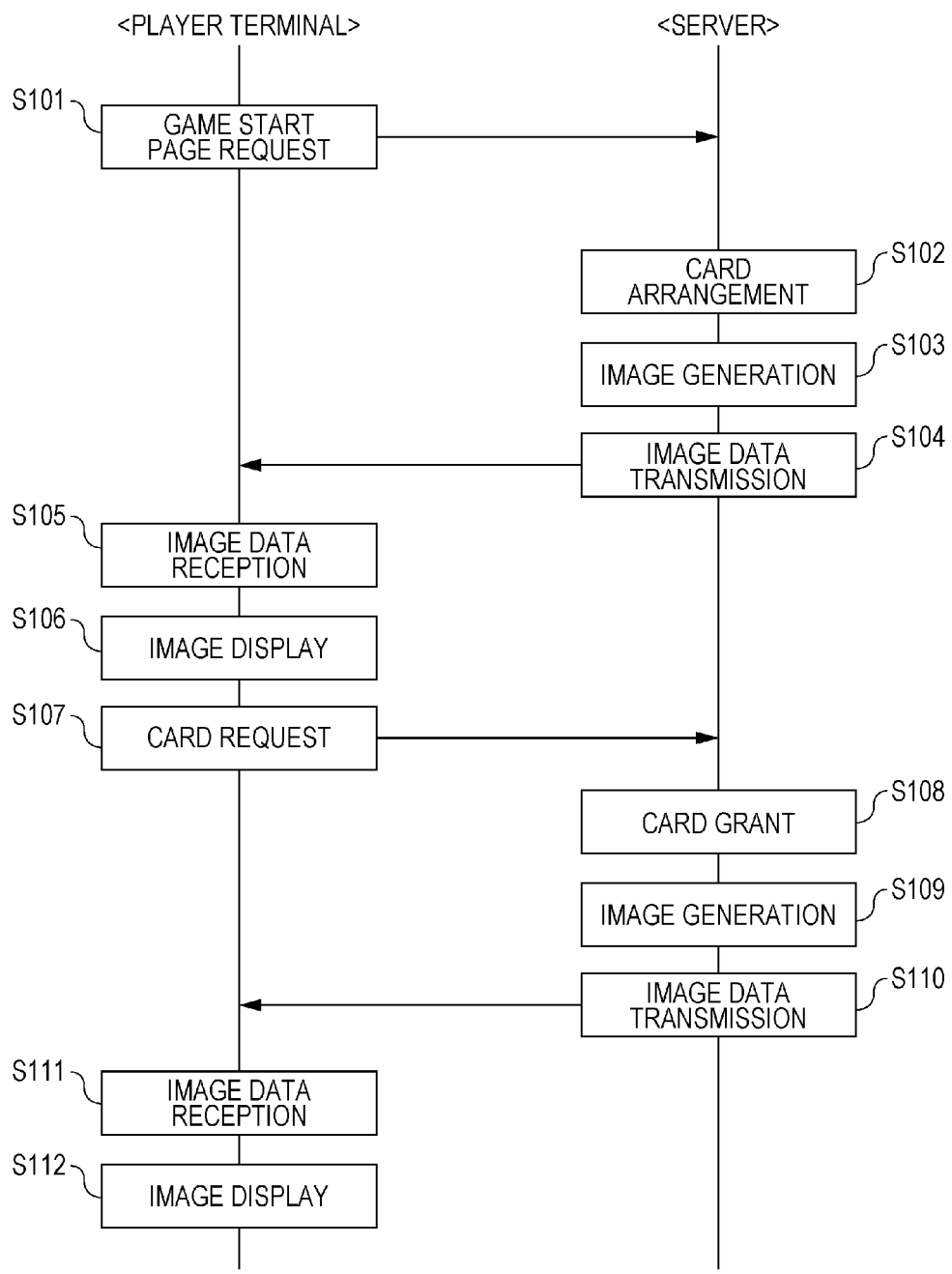
FIG. 10 is a flowchart for describing an exemplary operation for granting a game card to a player in the game system according to the present embodiment.

FIG. 10 is a flowchart for describing an exemplary operation for granting a game card to the player in the game system 1 according to the present embodiment.

First, in the player terminal 20, upon receiving an operation input of the player from the terminal input unit 23, the terminal control unit 21 transmits a command for acquiring a start page of a target hitting game (game start page request) to the server device 10 through the terminal communication unit 25 (S101).

Next, upon receiving the game start page request transmitted from the player terminal 20, the server device 10 executes card arrangement processing in which a game card is arranged in each of the unit areas that configure the card arrangement area (S102). That is, the arrangement unit 111 arranges each game card in association with each unit area that configures the card arrangement area based on the card arrangement information (see FIG. 9) stored in the data storage unit 12.

Next, the server device 10 causes the image data generation unit 115 to generate image data for displaying a start page of the target hitting game (game start screen) in the player terminal 20 (S103). The image data generation unit 115 generates image data in which the card arrangement area, where the game cards are arranged by the arrangement unit 111, is included in the start page.

The communication unit 15 of the server device 10 then transmits the image data corresponding to the start page of the target hitting game generated by the image data generation unit 115 to the player terminal 20 of the requestor through the network 2 (S104).

Figure 11:
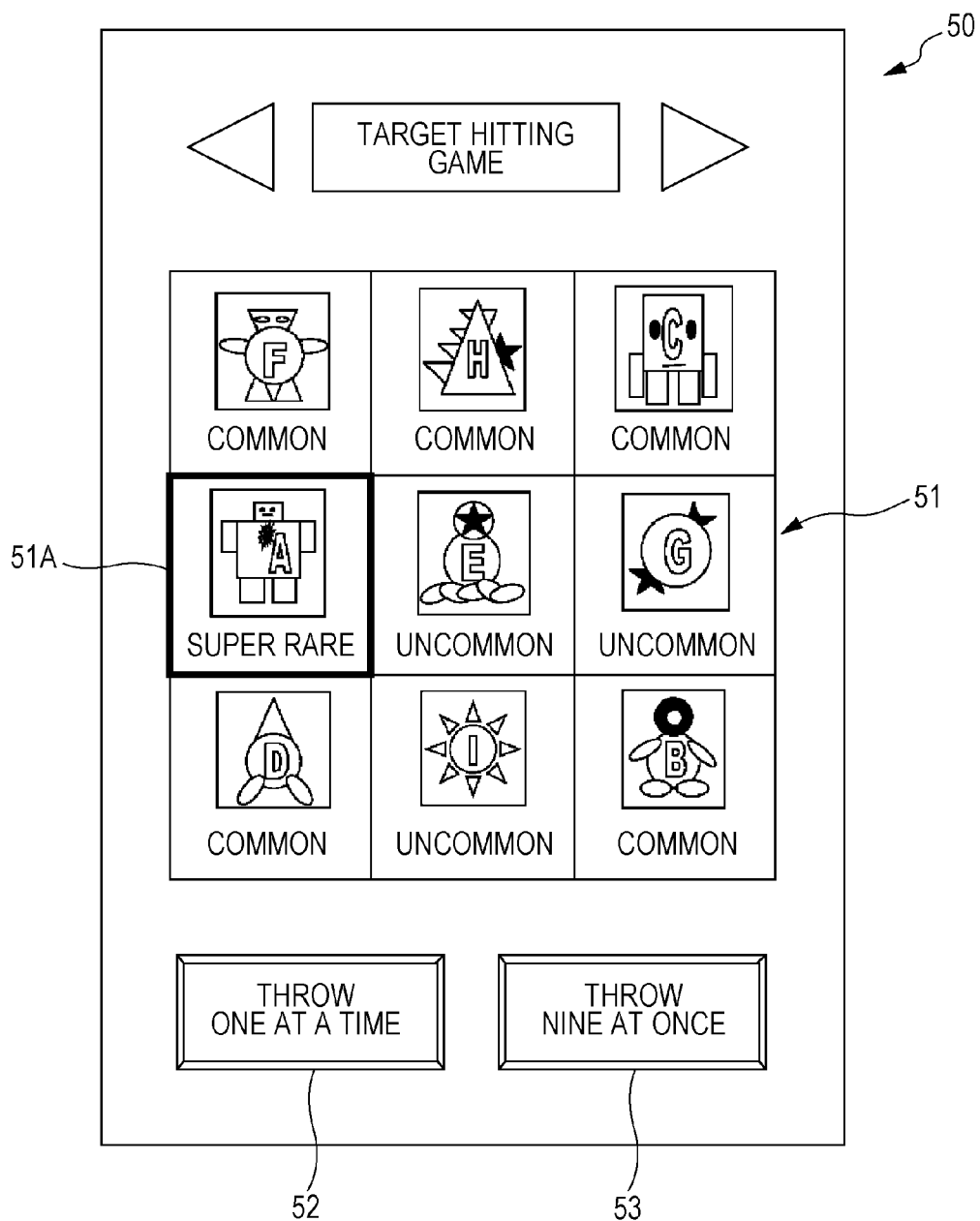
FIG. 11 is a diagram illustrating an exemplary game screen where a target hitting game is started.

Next, upon receiving the image data transmitted from the server device 10 through the terminal communication unit 25 (S105), the player terminal 20 causes the terminal display unit 24 to display the start page of the target hitting game based on the received image data (S106). FIG. 11 is a diagram illustrating an example of the start page of the target hitting game. A start page 50 of the target hitting game includes a card arrangement area 51, an operation button 52 for throwing one ball at a time, and an operation button 53 for throwing nine balls at once. Here, the card arrangement area 51 includes a super rare card 51A as one example of the special card. As described above, since game cards having a possibility of being granted are presented in advance, the player's expectation of obtaining the super rare card can be enhanced.

Next, referring back to FIG. 10, when the terminal control unit 21 of the player terminal 20 is displaying the start page of the target hitting game illustrated in FIG. 11 in the terminal display unit 24, an operation command (card grant request) is transmitted from the player terminal 20 to the server device 10 (S107) when the operation button 52 or the operation button 53 is selected through the operation of the terminal input unit 23 by the player.

Next, upon receiving the card grant request transmitted from the player terminal 20, the server device 10 executes game processing of the target hitting game for granting a game card to the player (S108).

In the game processing of the target hitting game, the determination unit 112 determines whether a super rare card is included in the card arrangement area based on the card arrangement information illustrated in FIG. 9. The grant unit 113 only accepts an operation input of the operation button 52 when it has been determined that a super rare card is included in the card arrangement area, allows one of the balls possessed by the player (see FIG. 5) to be consumed, and grants the player one game card selected from the plurality of game cards arranged in the card arrangement area 51. In this manner, all of the nine game cards arranged in the card arrangement area 51 are limited not to be granted to the player at once, so that the super rare card cannot be easily obtained by the player, and the incentive of the player for the target hitting game is enhanced. Meanwhile, when it has been determined that a super rare card is not included in the card arrangement area, the grant unit 113 accepts the operation inputs of the operation button 52 and the operation button 53, allows one or nine out of the balls possessed by the player (see FIG. 5) to be consumed, and grants the player one game card selected from the plurality of game cards arranged in the card arrangement area, or all of the nine game cards. In this manner, when a game card is granted to the player, the possessed card information illustrated in FIG. 6 is updated (the player obtains the card).

Here, in the present embodiment, selection of a game card in the card arrangement area is performed as follows. That is, the probability of the game card being selected by the grant unit 113 is varied for each rarity by weighting the rarity of the game card. For example, when a super rare card is arranged in one of the nine squares and uncommon cards are arranged in the remaining eight squares, the probability of the super rare card being selected is set to 1/81, and the probability of the uncommon card being selected is set to 10/81 where the weight of the super rare card is 1 and the weight of the uncommon card is 10. By doing so, the super rare card and the uncommon card are not to be selected with the same probability of 1/9.

Further, in the game processing of the target hitting game, when a super rare card is included in the card arrangement area, a time limit is imposed on the arrangement of the super rare card. That is, the arrangement unit 111 starts counting after the super rare card is arranged in the card arrangement area (starts counting after the card arrangement information illustrated in FIG. 9 is updated), and the arrangement unit 111 controls the super rare card not to be arranged in the card arrangement area (causes the square in which the super rare card has been arranged to be in a vacant state) after the predetermined time limit has elapsed. The arrangement unit 111 then arranges, in the square, another game card selected from the plurality of game cards in the card box in place of the super rare card.

Further, in the game processing of the target hitting game, when the grant unit 113 grants one game card to the player in response to the operation input of the operation button 52, the arrangement unit 111 sets the square where the game card has been arranged to be in the vacant state. Further, when the grant unit 113 grants all of the nine pieces of game content to the player at once in response to the operation input of the operation button 53, all of the nine squares, in which all of the nine pieces of game content are respectively arranged, are set to be in a vacant state. The arrangement unit 111 sets the probability of a super rare card being arranged in the latter case (granting nine game cards) to be higher than that in the former case (granting one game card) when the square being set in the vacant state is replenished with a new game card. To be specific, in the former case, the arrangement unit 111 arranges one game card selected from the first card box in numerical order in one square in the vacant state by referring to the card box information (see FIG. 7) stored in the data storage unit 12. In the latter case, the arrangement unit 111 arranges nine game cards selected from the second card box in numerical order in all of the nine squares in the vacant state by referring to the card box information (see FIG. 8) stored in the data storage unit 12. In this manner, the square in the vacant state is more likely to be replenished with the super rare card when the target hitting game is performed by consuming nine balls than when the target hitting game is performed by consuming one ball.

Next, referring back to FIG. 10, when the game card to be granted to the player is determined by the execution of the target hitting game in this manner, the control unit 11 of the server device 10 causes the image data generation unit 115 to generate image data that indicates a result of the target hitting game (S109).

The communication unit 15 of the server device 10 then transmits the image data generated by the image data generation unit 115 to the player terminal 20 of the requestor through the network 2 (S110).

Upon receiving the image data transmitted from the server device 10 through the terminal communication unit 25 (S111), the player terminal 20 then causes the terminal display unit 24 to display a game screen that shows the result of the target hitting game based on the received image data (S112). The player can confirm a granted game card and the like by looking at the game screen displayed on the terminal display unit 24.

As described above, according to the game system 1 of the present embodiment, the game cards arranged in the plurality of squares that configure the card arrangement area 51 are granted to the player. When it has been determined that a super rare card is included in the card arrangement area 51, a game card selected from the plurality of game cards arranged in the card arrangement area 51 is granted to the player after limiting all of the nine game cards arranged in the card arrangement area 51 not to be granted to the player at once. Therefore, the super rare card cannot be easily obtained, and the incentive of the player for the target hitting game can be enhanced.

<Modification 1>

Figure 12:
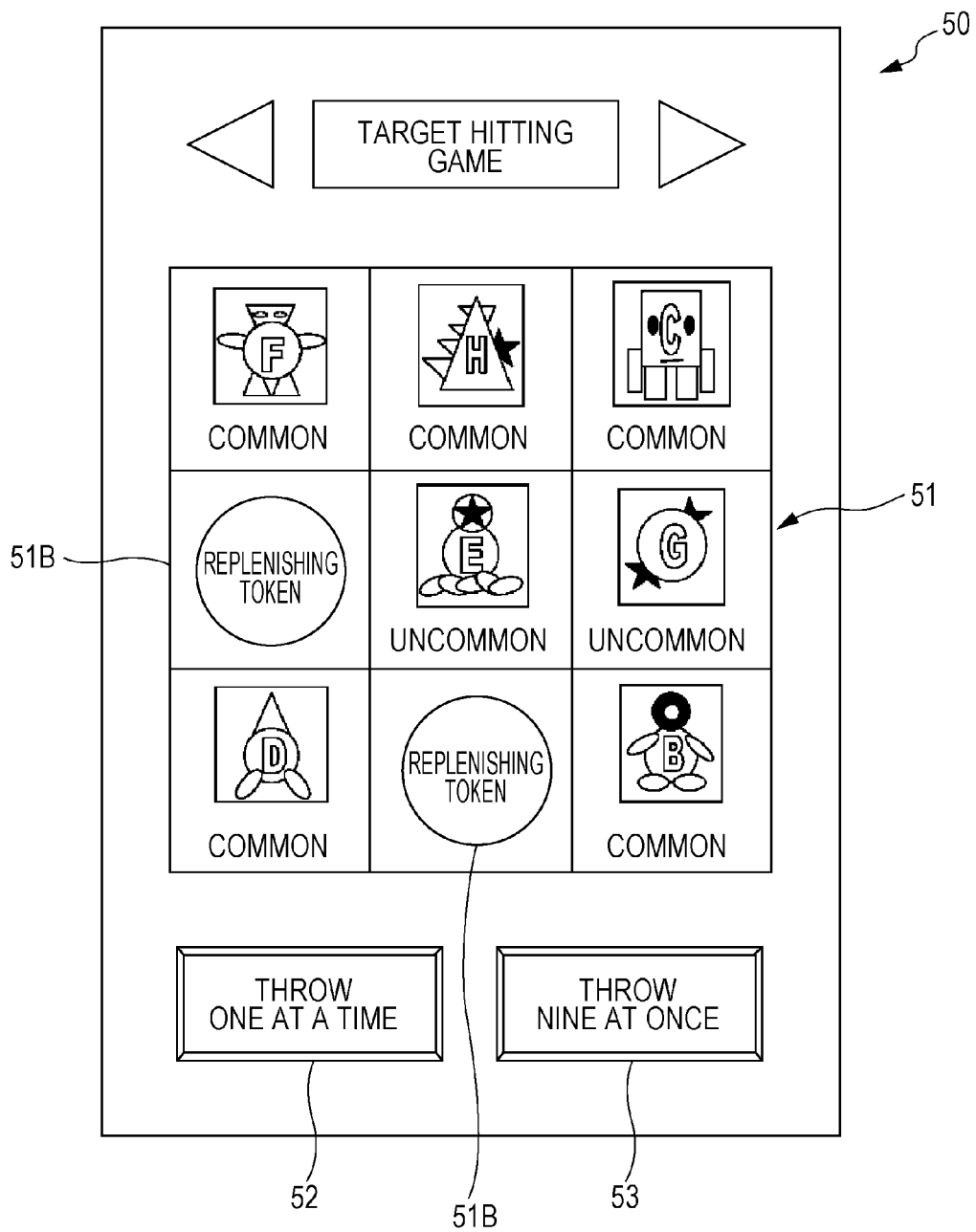
FIG. 12 is a diagram for describing a modification.

FIG. 12 is a diagram for describing a modification. In the above-described target hitting game, a replenishing token 51B can be arranged in a card arrangement area 51 divided into a total of nine (3×3) squares. The replenishing token 51B is an item that can forcibly arrange a super rare card in the card arrangement area 51.

The probability of the replenishing token 51B being arranged in the card arrangement area 51 is set higher than the probability of a super rare card being arranged. That is, there is only one super rare card in a card box, but there are more than one replenishing token in the card box.

In the present embodiment, when the player performs a target hitting game, and when a total of five or more replenishing tokens 51B are selected from the card arrangement area 51 and granted to the player by the grant unit 113, the super rare card is forcibly arranged in the card arrangement area 51 by the arrangement unit 111. In this manner, the player collects a plurality of replenishing tokens that can be obtained more easily than the super rare card, so that the super rare card is more likely to be arranged in the card arrangement area 51. Therefore, the incentive of the player for the target hitting game can be enhanced.

<Modification 2>

Figure 13A:
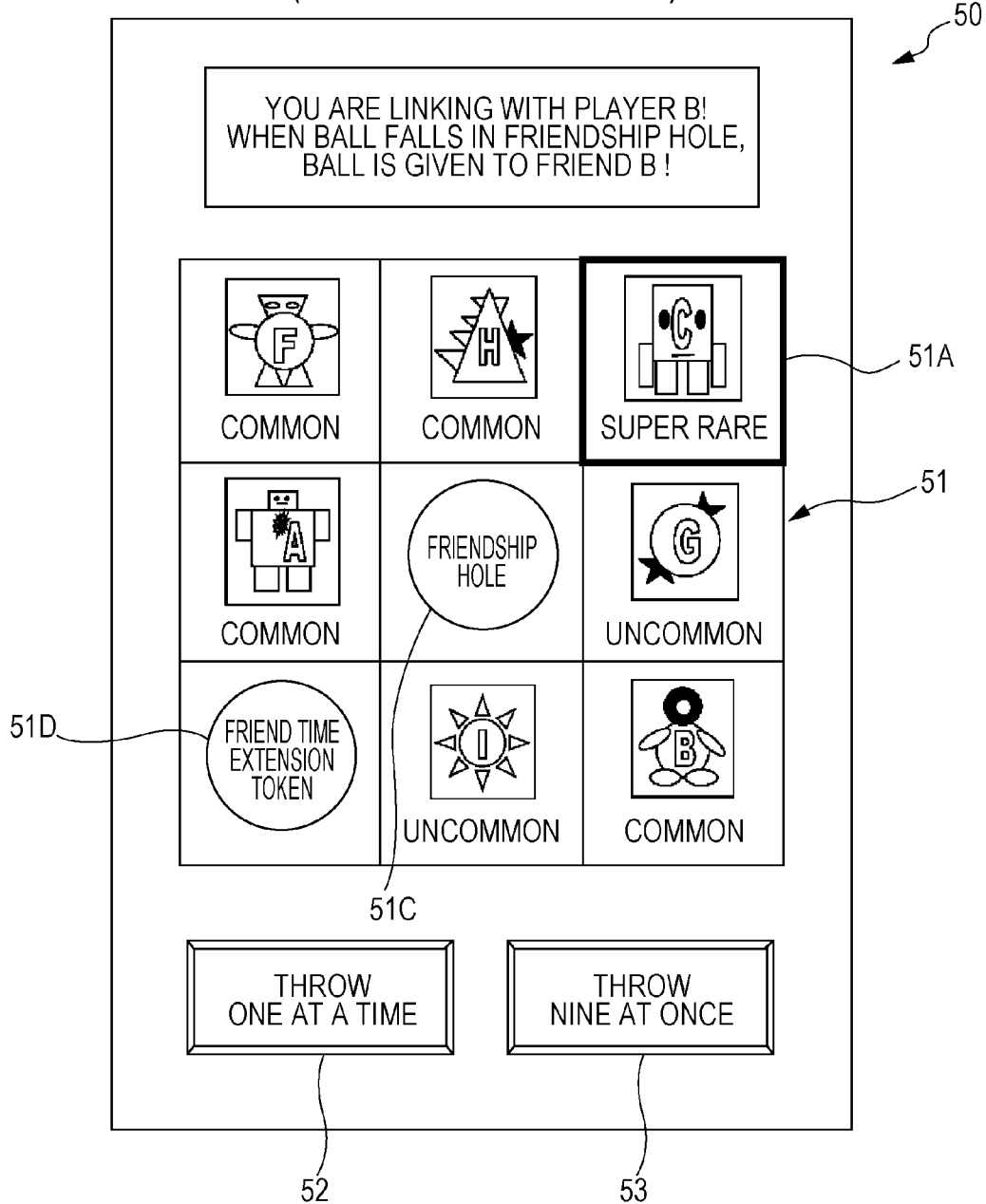

FIGS. 13A and 13B are diagrams for describing another modification. The above-described target hitting game can be cooperatively played with other players. In this cooperative play, when a super rare card 51A appears in a card arrangement area 51 in a game screen of a player A (see FIG. 13A), the super rare card 51A also appears in a card arrangement area 51 in a game screen of a player B (see FIG. 13B). If the player A and the player B can obtain super rare cards, respectively, a benefit is granted to both of the players.

In this cooperative play, when the player A obtains the super rare card first as a result of a target hitting game, for example, the text "Player A has got a super rare card! Five-minute extension!" is displayed on the game screen of the player B due to the obtainment by the player A (see FIG. 13B), and the game time of the player B who has not obtained the super rare card is extended. Accordingly, more chances to obtain the super rare card can be given to the player B.

In the cooperative play, a friendship hole 51C can be arranged in the card arrangement area 51 that is divided into a total of nine (3×3) squares (see FIG. 13A). The friendship hole 51C is an item that can increase the number of balls possessed by other players. For example, when the player A who has obtained the super rare card performs a target hitting game, and when the friendship hole 51C is selected from the card arrangement area 51 and is granted to the player A by the grant unit 113, the number of balls possessed by the player B who has not obtained the super rare card is increased by one, and the player information (see FIG. 5) is updated. As a result, the player A who has obtained the super rare card can continue the game play as well as the player B who has not obtained the super rare card can get more chances to obtain the super rare card.

Further, in the cooperative play, a friend time extension token 51D can be arranged in the card arrangement area 51 that is divided into a total of nine (3×3) squares (see FIG. 13A). The friend time extension token 51D is an item that can extend the time of the target hitting game. For example, when the player A who has obtained the super rare card performs a target hitting game, and when the friend time extension token 51D is selected from the card arrangement area 51 and is granted to the player A by the grant unit 113, the time of the target hitting game of the player B who has not obtained the super rare card is further extended. Accordingly, more chances to obtain the super rare card can be given to the player B.

By performing the cooperative play in this manner, communication with other players becomes possible.

<Modification 3>

The above-described target hitting game can be played as a battle play against other players. In this battle play, card arrangement areas of the players are replenished with game cards selected from a common card box one after another in numerical order, and the game cards are arranged, so that the players can mutually compete for obtaining a super rare card.

Further, in this battle play, the game cards possessed by another player are arranged in the own card arrangement area, so that the players can mutually compete for obtaining the game cards possessed by the opponent. When a square in a vacant state is generated by the game card being granted to the player, an arrangement unit 111 refers to possessed card information illustrated in FIG. 6 to select a game card possessed by another player, and arranges the selected game card in the square in the vacant state.

By performing the battle play in this manner, communication with other players becomes possible.

Other Embodiments

The above-described embodiments have been given for easy understanding of the present invention, and are not used to interpret the present invention in a limited manner. The present invention can be changed and improved without departing from the gist of the invention and includes equivalents thereof. Especially, embodiments described below are also included in the present invention.

<Card Arrangement Area>

In the above-described embodiments, the card arrangement area including a total of nine (3×3) squares has been described as an example. However, the present invention is not limited to this example. Also, the shape of a unit area that configures the card arrangement area is not limited to the square.

<Grant of Game Card>

In the above-described embodiments, an example in which one game card selected from a plurality of game cards in a card arrangement area is granted to the player by consuming one ball in a target hitting game, and an example in which all of nine game cards are granted to the player at once by consuming nine balls in a target hitting game have been described. However, the present invention is not limited to these examples. For example, two or more game cards selected from the plurality of game cards in the card arrangement area may be granted to the player by consuming one ball. Further, less than nine game cards may be granted to the player at once by consuming nine balls. Further, the game may be controlled such that no game card in the card arrangement area is granted to the player despite consuming one or nine balls.

Further, in the above-described embodiments, the target hitting game can be performed in succession. When three squares in a vacant state are aligned in one of vertical, horizontal, and oblique lines in a total of nine (3×3) squares by successively granting the game cards (when so-called bingo is established), a benefit may be granted. For example, when the square in the vacant state is replenished with a game card and the game card is arranged, the super rare card is more likely to be arranged in the card arrangement area by selecting the game card from a second card box instead of from a first card box.

<Server Device>

In the above-described present embodiments, the game system 1 provided with one server device 10 as an example of a server device has been described. However, the game system 1 is not limited to this example, and may be provided with a plurality of server devices 10 as examples of the server device. That is, a plurality of server devices 10 is connected through a network 2, and each of the server devices 10 may perform various types of processing in a distributed manner. Note that the server device 10 is an example of a computer.

<Information Processing Apparatus>

In the above-described game system 1 in the present embodiments, an example has been described in which various types of processing are executed based on a game program by the server device 10 and the player terminal 20 in cooperation with each other. However, the game system 1 is not limited to the example. The above-described various types of processing may be executed by the player terminal 20 alone or by the server device 10 alone as an information processing apparatus based on the game program.

Further, the player terminal 20 may perform a part of the functions as the information processing apparatus. In this case, the server device 10 and the player terminal 20 configure the information processing apparatus.

Note that the information processing apparatus is an example of a computer.

<Game Program>

In the game system 1 of the above-described embodiments, an example has been described in which the various types of processing are executed by the server device 10 and the player terminal 20 in cooperation with each other. The present invention includes a game program for executing such processing. That is, the server device 10 and the player terminal 20 as the information processing apparatuses may execute the above-described various types of processing based on the game program.

What is claimed is:

1. A server device connected with a player terminal that displays a game screen including a game content arrangement area in a manner capable of communicating information, the server device comprising:
 a storage unit configured to store a plurality of pieces of game content including special game content;
 an arrangement unit configured to arrange game content selected from the plurality of pieces of game content in the game content arrangement area;
 a determination unit configured to determine, upon request from the player terminal, whether the special content is included in a plurality of pieces of game content arranged in the game content arrangement area; and
 a grant unit configured to:
  grant to a player, when the special game content is not included in the plurality of pieces of game content arranged in the game content area, one of:
   a part of game content selected from the plurality of pieces of game content arranged in the game content arrangement area, and
   all of game content arranged in the game content arrangement area,
  and to grant to the player, when the special game content is included in the plurality of pieces of the game content arranged in the game content area, only a part of game content selected from the plurality of pieces of game content arranged in the game content arrangement area.

2. The server device according to claim 1,
wherein the game content arrangement area includes a plurality of unit areas,
the arrangement unit arranges the game content in each of the plurality of unit areas, and
upon request from the player terminal, the grant unit is configured to:
 grant, when the special game content is not included in the game content arrangement area, at least one or more pieces of game content selected from the game content arranged in the plurality of unit areas to the player, and
 grant, when the special game content is included in the game content arrangement area, game content less than the total number of the unit areas to the player.

3. The server device according to claim 2,
wherein, when one piece of game content is granted to the player by the grant unit, the arrangement unit sets a unit area corresponding to the granted game content to be in a vacant state in which game content is not arranged,
wherein, when a plurality of pieces of game content is given to the player at once by the grant unit, the arrangement unit sets each of a plurality of unit areas corresponding to the plurality of pieces of granted game content to be in the vacant state in which game content is not arranged, and
wherein, when new game content is arranged in the unit area set in the vacant state, the arrangement unit sets a probability of the special game content being arranged as the new game content to be higher in the case where the plurality of pieces of game content is granted to the player at once than in the case where the one piece of game content is granted to the player.

4. The server device according to claim 3,
wherein the storage unit stores at least one or more pieces of game content possessed by the player and another player, respectively, and
the arrangement unit selects game content possessed by the another player by referring to the storage unit, and arranges the selected game content in the unit area in the vacant state.

5. The server device according to 1,
wherein the arrangement unit controls the special game content to be arranged for a predetermined time when the special game content is included in the plurality of pieces of game content arranged in the game content arrangement area.

6. A non-transitory computer-readable storage medium storing a game program for causing a computer, which serves as a server device connected with a player terminal that displays a game screen including a game content arrangement area in a manner capable of communicating information, to realize:

storing a plurality of pieces of game content including special game content in a storage unit;

arranging game content selected from the plurality of pieces of game content in the game content arrangement area;

determining, upon request from the player terminal, whether the special game content is included in a plurality of pieces of game content arranged in the game content arrangement area; and granting, to a player when the special game content is not included, one of:

a part of game content selected from the plurality of pieces of game content arranged in the game content arrangement area, and all of game content arranged in the game content arrangement area and, granting, to the player when the special game content is included, only a part of game content selected from the plurality of pieces of game content arranged in the game content arrangement area.

7. The non-transitory computer readable storage medium of claim 6, wherein the game content arrangement area includes a plurality of unit areas, the arrangement unit arranges the game content in each of the plurality of unit areas, and upon request from the player terminal, the instructions further comprising:

granting, when the special game content is not included in the game content arrangement area, at least one or more pieces of game content selected from the game content arranged in the plurality of unit areas to the player, and granting, when the special game content is included in the game content arrangement area, game content less than the total number of the unit areas to the player.

8. The non-transitory computer readable storage medium of claim 7, wherein, when one piece of game content is granted to the player, the instructions further comprise:

setting a unit area, in which the granted game content has been arranged, to be in a vacant state in which game content is not arranged, when a plurality of pieces of game content is given to the player at once, setting each of a plurality of unit areas, in which the plurality of pieces of granted game content is arranged, to be in the vacant state in which game content is not arranged, arranging new game content in the unit area set in the vacant state, and setting a probability of the special game content being arranged as the new game content to be higher in the case where the plurality of pieces of game content is granted to the player at once than in the case where the one piece of game content is granted to the player.

9. The non-transitory computer readable storage medium of claim 8, wherein the instructions further comprise:

storing at least one or more pieces of game content possessed by the player and another player, respectively, and selecting game content possessed by the another player by referring to the storage unit, and arranges the selected game content in the unit area in the vacant state.

10. The non-transitory computer readable storage medium of claim 7, wherein the instructions further comprise controlling the special game content to be arranged for a predetermined time when the special game content is included in the plurality of pieces of game content arranged in the game content arrangement area.

\* \* \* \* \*